Dec. 4, 1928.
C. V. MARQUART
1,694,100
SAFETY APPLIANCE FOR BRAKE BEAMS
Filed Feb. 7, 1928
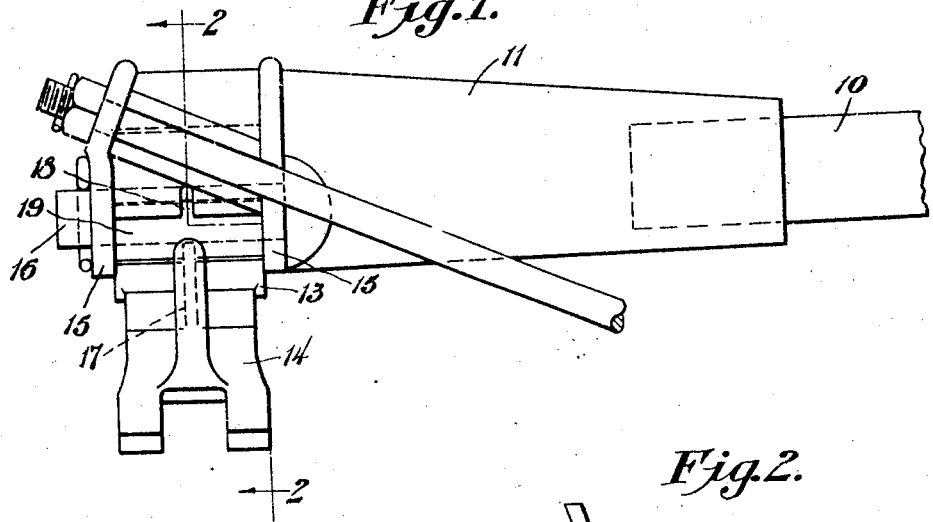
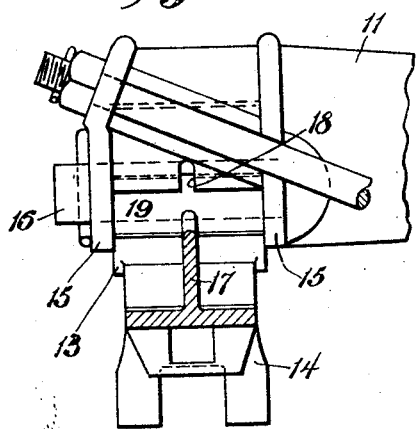
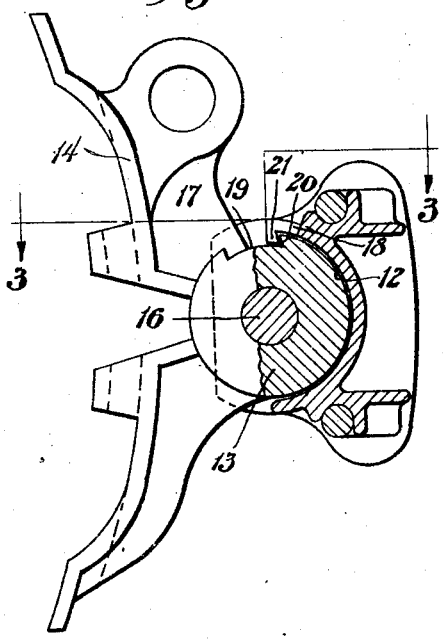
INVENTOR
Charles V. Marquart
BY
Ziggers + Adams
ATTORNEYS Patented Dec. 4, 1928.

1,694,100

UNITED STATES PATENT OFFICE.

CHARLES V. MARQUART, OF SANDUSKY, OHIO.

SAFETY APPLIANCE FOR BRAKE BEAMS.

Application filed February 7, 1928. Serial No. 252,576.

This invention relates to safety appliances for brake beams and aims, among other objects, to provide improved means to prevent accidental separation of a brake shoe head from a brake beam and thereby avoid danger of derailments of railway cars caused by parts of the brake system falling on the right of way. This application involves an improvement on the brake beam shown in my Patent No. 994,323, dated June 6, 1911.

Referring to the drawings,

Fig. 1 is a fragmentary top plan view of one end of a brake beam embodying a preferred form of my improvements;

Fig. 2 is a combined sectional and elevational view taken on the line 2—2 of Fig. 1; and Fig. 3 is a sectional view taken on the line 3—3 of Fig. 2.

In connection with the operation of my improved, balanced, adjustable brake beam shown in my prior patent above referred to, there is some danger of accidental separation of the brake head from its socket due to shearing or loss of the pivot bolt or pin which passes through the socket. Such separation is apt to result in derailment of railway cars because one end of the beam might fall on the right of way.

Heretofore, various devices for holding brake heads on beams have been invented, but all of them of which I am aware include more or less complicated fastenings requiring considerable labor to remove them. It is necessary to remove parts of brake shoes quite often because they are subjected to very severe wear and the cost of maintenance becomes quite a serious item. This invention aims to provide a self-locking, quick detachable brake head which requires a minimum expense of upkeep and which is very reliable in operation.

Referring particularly to the drawings there is shown a part of a brake beam 10 which may be substantially like that shown in my prior patent wherein there is provided an end casting 11 having an open socket portion 12, for receiving the hub portion 13 of the usual brake head 14. As described in my prior patent, the hub portion is adapted to be inserted in the socket between two end walls 15 (see Fig. 3) and pivoted therein by means of a pin 16.

Referring to Figures 2 and 3 the brake head is shown as having a reenforcing web 17 projecting rearwardly of the brake shoe holding portion and the upper wall of the socket has a slot 18 for receiving the web when the brake head is being inserted in the socket.

In accordance with the present invention, the socket 12 and the hub portions 13 are shown as having provision for locking the brake head in place while the brake is in service to prevent separation of the head from the socket even though the pin 16 may be sheared or broken. Herein, the hub portion 13 has an arcuate notch 19 of substantial length around the periphery of the hub and presents at one end an abutment 20 to cooperate with a locking lug 21 on the upper wall of the socket and projecting inwardly and substantially radially towards the axis of the pivot pin 16. The arrangement is such that the brake head is to be inserted by first engaging the notched portion inside the locking lug 21 and then turning it in a counter-clockwise direction until it is seated in the socket. Then, the locking pin 16 may be inserted and held in place by means of a nut, cotter pin, or other suitable means.

It will be observed that when the brake is in service, its position with respect to the wheel with which it cooperates is such that it cannot be swung to a position wherein it can be released from the socket, assuming that the pin is broken. In fact, the tendency will be for the brake shoe to swing in a counter-clockwise direction more firmly locking the hub portion thereof in the socket.

Obviously the present invention is not restricted to the particular embodiment thereof herein shown and described.

What is claimed is:—

1. In combination with a brake beam, an open socket member adapted to receive a brake head; said head having a portion insertable in the socket when the head is turned to a position beyond its working range; a pivot pin passing through said socket and the head portion therein; and means for retaining the head in the socket after the pivot pin is accidentally broken or lost.

2. In combination with a brake beam, an open socket member adapted to receive a brake head; said head having a hub portion insertable in the socket when the hub is turned to a position beyond its working range; a reenforcing web on the hub; one wall of the socket presenting a notch for receiving said web and permitting the movement of the head beyond the working range; the hub portion of the head presenting a locking notch having an abutment; and said socket portion adjacent to its open edge presenting a locking lug cooperating with said notch to prevent accidental separation of the head from the socket.

3. In combination with a brake beam, a socket member; a brake head removably mounted in said socket member; a pivot pin passing through said socket member and a portion of said brake head to permit adjustment thereof; and cooperating means on the brake head and on the socket member to prevent accidental separation of the head from the socket when the pin is broken.

4. In combination with a brake beam, a brake head pivotally and removably connected thereto; said head having a hub portion presenting an arcuate notch; and said beam presenting a locking lug cooperating with said notch.

5. A safety appliance for brakes comprising, in combination, a brake head; a socket member for receiving a portion of the brake head; means pivotally connecting the brake head within the socket; and cooperating locking abutments on the head and on the socket member to prevent separation of the head from the socket while the brake is in service.

6. A brake head having a hub pivotally connected to a brake beam; and a self-locking connection between the hub and beam to prevent accidental separation.

In testimony, that I claim the foregoing as my own, I have hereto affixed my signature.

CHARLES V. MARQUART.